(No Model.)

S. HOROWITZ & M. RAGENDORF.
TOBACCO CURING APPARATUS.

No. 309,054. Patented Dec. 9, 1884.

Attest
Joseph H. Sims
A. Gluchowsky

Inventors
Samuel Horowitz
Morise Ragendorf
by Wood & Weyl
their Attorneys &c

UNITED STATES PATENT OFFICE.

SAMUEL HOROWITZ AND MORISE RAGENDORF, OF CINCINNATI, OHIO.

TOBACCO-CURING APPARATUS.

SPECIFICATION forming part of Letters Patent No. 309,054, dated December 9, 1884.

Application filed April 16, 1884. (No model.)

*To all whom it may concern:*

Be it known that we, SAMUEL HOROWITZ and MORISE RAGENDORF, citizens of the United States, and residents of Cincinnati, in the county of Hamilton and State of Ohio, have invented certain new and useful Improvements in Tobacco-Curing Apparatus, of which the following is a specification.

Our invention relates to an improved tobacco-curing apparatus.

The object of our invention is to prepare the leaf-tobacco and cigar-wrappers so as to be of a uniform color.

Another object of our invention is to improve the flavor of the leaf, all of which will be fully set forth in the description of the accompanying drawings, in which—

Figure 1:
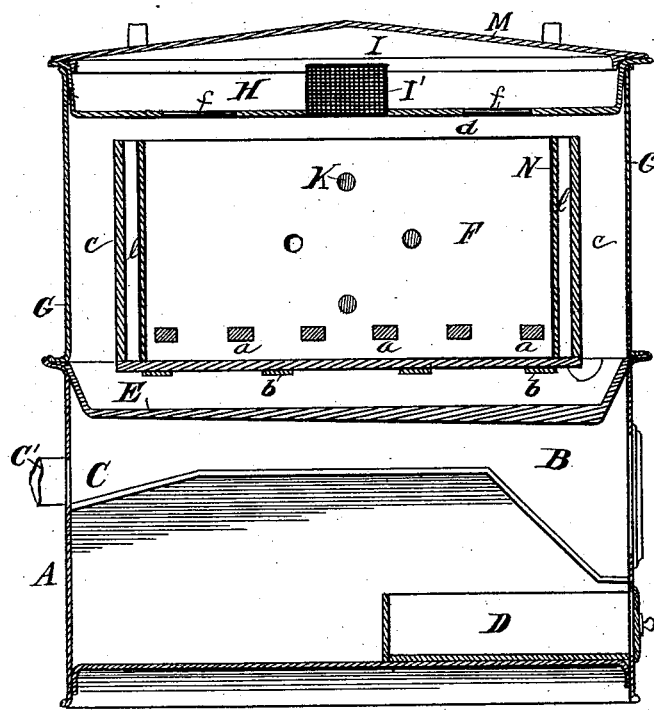
Figure 2:
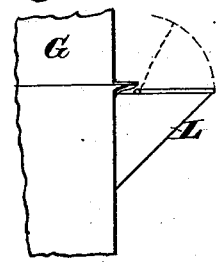
Figure 5:
Figure 3:
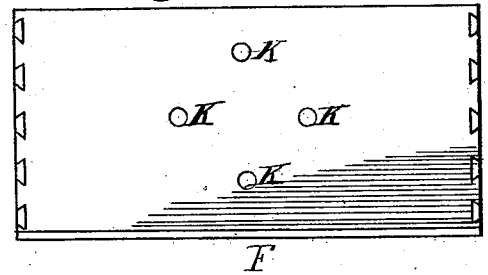
Figure 4:
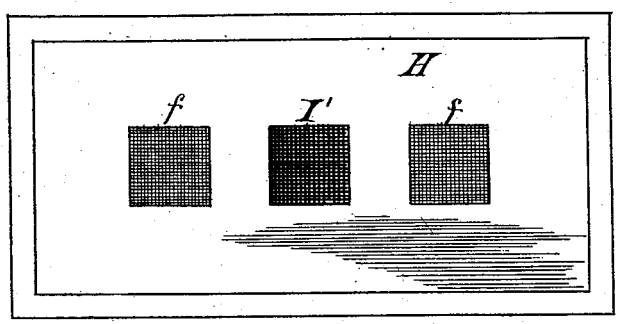

Figure 1 is a vertical cross-section of our improvement. Fig. 2 is a similar section showing the means for supplying water to the pan. Fig. 3 is a side elevation of the heating-box. Fig. 4 is a bottom plan view of the pan H, and Fig. 5 a detached top plan view of the cedar heating-box on a reduced scale.

A represents the heater; B, the fire-box; C, the heating-chamber; C', the flue; D, the ash-box; E, a pan which is inserted in the heater-shell A above the fire-box B and chamber C.

F represents a cedar box in which the leaf-tobacco is placed.

*a* represents rails or ledges on which the tobacco rests.

*b* represents metal slats which stretch from side to side of the pan E, and upon which the curing-box F rests.

*c* represents steam-passages communicating from the pan E outside of the box F to the space *d* above said box.

*l l* represent spaces formed by partitions N, which are placed inside at the ends of box F, and these spaces are filled with cedar saw-dust in order to keep the stems of the leaves dry, the tobacco being laid in the box F, with the stems abutting against the partitions N.

H represents a pan or receptacle inserted in the top of the shell G.

*d* represents a space between the box F and pan H.

I' represents an elevated foraminous hood over an opening through the pan for the passage of steam heat into the space I above the pan H.

*f f* represent additional passages formed in the pan H, which are covered with wire-gauze.

K represents holes or perforations formed in the side of the box F for the admission of steam heat into the box.

The mode of operation is as follows: Cedar sawdust or shavings are placed in the pan H and also in the spaces *l* of cedar box F. The interior of box F is filled with tobacco-leaf, which is laid in loosely in bunches, the ends abutting against partition N. The pan E is filled with water and the fire placed in the fire-box B, and the water is heated until steam is raised, when it ascends the passages *c c* and through the foraminous material over the perforations in the pan H into the pan H, where it is chiefly condensed by the cedar sawdust in the pan.

The object of the cedar sawdust is to absorb the condensed steam and to take up a portion of the heat, so as to prevent the tobacco being too highly heated, and to raise it to the desired degree slowly; also to preserve a uniform heat with a small amount of moisture throughout the box F. The rails *a a* are elevated some little distance above the bottom of the box F, so as not to be too near the boiling-hot water, and to allow hot moist air to circulate between the tobacco and the bottom of the heating-box F. The cedar sawdust absorbs the gases thrown off from the steamed tobacco, and the cedar also throws off the aromatic flavor, which is imparted to the tobacco in box F. Tobacco cured in this manner can be made of very uniform color, the darkness of the coloring depending on the length of time to which it is subjected to the process. Four or six hours is sufficient time for an ordinary charge to be cured.

L represents a spout communicating with pan E from the outside, for observing the condition of the water in the pan, and for filling it from time to time. When the sawdust in pan H becomes so much moistened that it will drip, the sawdust is removed and a new charge is supplied. The moistened charges may be dried and used over again.

M represents a lid which covers the apparatus, which may be removed for access to the pan H, which pan is also made removable for access to the heating-box F.

Instead of employing cedar shavings in the pan H the interior of the heating-shell G might be lined with cedar; or cedar might be introduced inside of the box for absorption of the same in other ways and still accomplish some of the results of our invention.

We claim—

1. A tobacco-curing apparatus consisting of the fire-box B, the pan E, the shell G, the perforated and open cedar heating-box F inclosed by the shell, whereby passages c are created between the shell and box, and the perforated pan H, arranged above the heating-box, substantially as described.

2. A tobacco-curing apparatus consisting of the fire-box B, the pan E, the shell G, the perforated and open heating-box F, having the partitions N, to create the end spaces, l, and inclosed by the shell, whereby passages c are left between the shell and box, and the perforated pan H, arranged above the heating-box, substantially as described.

In testimony whereof we have hereunto set our hands.

S. HOROWITZ.
MORISE RAGENDORF.

Witnesses:
A. GLUCKOWSKY,
MAY MILLIKEN.